INVENTORS
Roswell J. Ruka and
Armand J. Panson.

United States Patent Office 3,691,023
Patented Sept. 12, 1972

3,691,023
METHOD FOR POLAROGRAPHIC MEASUREMENT OF OXYGEN PARTIAL PRESSURE
Roswell J. Ruka and Armand J. Panson, Pittsburgh, Pa., assignors to Westinghouse Electric Corporation, Pittsburgh, Pa.
Continuation of abandoned application Ser. No. 773,540, Nov. 5, 1968. This application Dec. 15, 1970, Ser. No. 98,476
Int. Cl. G01n 27/46
U.S. Cl. 204—1 T
5 Claims

ABSTRACT OF THE DISCLOSURE

An oxygen gauge which includes a solid electrolyte electrochemical cell in which oxygen is electrolyzed at a potential of sufficiently high value to obtain a limiting cell current determined by the rate at which oxygen diffuses to the electrode. This cell current is proportional to the oxygen partial pressure.

This is a continuation application of copending patent application Ser. No. 773,540, filed Nov. 5, 1968, entitled, "Solid State Polarographic Oxygen Gauge," now abandoned.

BACKGROUND OF THE INVENTION

Field of the invention

This invention is related in general to an oxygen sensing device and in particular to a solid state oxygen device operating as a polarographic oxygen sensor.

Description of the prior art

The polarographic method of chemical analysis has found wide application in conjunction with aqueous solutions but has not to date been successfully applied to high temperature gas analysis utilizing a solid state gas analyzer.

The applications of the liquid polarographic gauge are limited due to the continuous depletion of the electrolyte in the form of evaporation.

Furthermore there exists several operational disadvantages encountered in using the liquid polarographic gauge including the requirement for the sample gas to dissolve in the liquid electrolyte before the gauge is oxygen responsive and the inability of the liquid gauge to respond to low oxygen pressures.

SUMMARY OF THE INVENTION

This invention consists of a pair of electrodes disposed on opposite sides of a solid electrolyte forming a solid state oxygen analyzer. A reference gas of relatively constant oxygen partial pressure is applied to one electrode and a gas of unknown oxygen partial pressure is applied to the second electrode. A D-C voltage of sufficient value to establish diffusion limited current operation is applied across the electrodes thereby depleting the oxygen at the surface of the second electrode. The cell current subsequently developed is a function of the rate at which oxygen diffuses from the body of the sample gas to the second electrode. This current measurement is an indication of the oxygen partial pressure of the sample gas.

The oxygen pressure responsive range of the solid state polarographic gauge extends to oxygen pressures below $10^{-6}$ atmospheres.

Furthermore the solid electrolyte, which does not deteriorate during operation, responds instantaneously to the sample gas oxygen partial pressure by analyzing the sample gas directly in the gas phase.

The compact, simple construction of the solid state polarographic gauge permits its application in temperature and pressure environments which are incompatible with the liquid polarographic gauge.

DESCRIPTION OF THE PREFERRED EMBODIMENT

Figure 1:
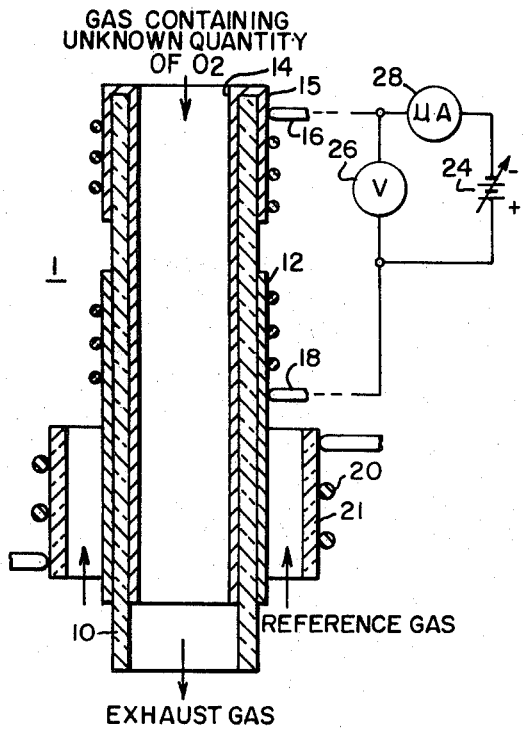
FIG. 1 is a cross-sectional view of a device in accordance with the present invention.

Referring to FIG. 1 there is illustrated a solid electrolyte electrochemical cell operating as a polarographic oxygen gauge. The polarographic oxygen gauge 1 comprises a tubular electrolyte member 10 of solid material, such as a solid solution of zirconium oxide and calcium oxide, which conducts oxygen ions with negligible electronic conductivity.

The tubular electrolyte member 10 is open-ended to permit the entrance of a gas of unknown oxygen partial pressure at one end thereof and exhaust of gas from the other end. Disposed on the outer surface of the electrolyte member 10 in conductive contact therewith is a first electronically conductive electrode 12. A second electronically conductive electrode 14 is disposed on the inner surface of the tubular electrolyte member and a substantial portion of it directly opposed the outer electrode by the inner electrode also extends around the end of the electrolyte so that a portion 15 is disposed on a portion of the outer surface of the tube. The electrodes 12 and 14 are of layers disposed in intimate contact with the electrolyte surface and have electrical continuity but are sufficiently porous to permit gas reactants to reach the electrolyte. It is necessary that the electrode materials be suitable for operation at the high temperature to which the device is subjected and members of the platinum group metals are suitable for this purpose.

Lead members 16 and 18 are disposed in conductive contact with each of the electrodes 12 and 14. The lead member 16 of the inner electrode 14 is disposed on the portion 15 of it which is on the outer surface of the electrolyte. The lead members 16 and 18 conveniently are of elongated members which are wrapped tightly around the electrodes and make good electrical contact therewith.

An electrical heater 20 is disposed around the portion of the electrolyte having the first and second electrodes 12 and 14 in opposing relationship so as to bring that portion of the electrolyte to the desired operating temperature of from about 600° C. to about 1000° C. A relatively high operating temperature appreciably increases the ionic conductivity of the electrolyte. The heater 20 is a resistance heater disposed on a suitable mounting 21 of a material such as aluminum oxide ceramic although other heater means may be employed. As a further alternative the gas may be heated externally and supplied hot to the device at a temperature sufficient to heat the electrolyte to the operating temperature.

In operation the gas whose oxygen content is to be measured is supplied at a uniform pressure and a fixed flow rate to the upper end of the tube. The flow rate is sufficient to minimize back diffusion of oxygen from the lower end of the tube from which the gas is exhausted to the atmosphere. The outside surface of the tube and the outer electrode 12 are disposed to a gas with a known quantity of oxygen for which air is naturally the most convenient. As a result of the difference in oxygen partial pressure on opposite surfaces of the electrode the following electrochemical reaction with oxygen occurs at the electrolyte surface:

$$O_2 + 4e^- = 2O^{2-}$$

The foregoing discussion of the structure of oxygen gauge 1 is considered sufficient for an understanding of discussion of the operation of this device as a polarographic oxygen gauge.

A basic distinction between the operation of cell 1 as an EMF gauge and as a polarographic gauge is the designation of anode and cathode and the direction of current flow. In the EMF gauge the electron current flows spontaneously to the high oxygen pressure electrode from the low oxygen pressure electrode thereby resulting in the designation of electrode 12 as the cathode and electrode 14 as the anode. The conversion of cell 1 to a polarographic gauge is accomplished by passing a current in the reverse direction to the low oxygen pressure electrode from the high oxygen pressure electrode thereby making electrode 14 the cathode and electrode 12 the anode. An analogy of this distinction is that the EMF gauge operates as a battery during normal discharge whereas the polarographic gauge represents a battery undergoing a charge, or a current flow which is the reverse of normal.

A detailed description of the material and structural arrangement of the oxygen gauge of FIG. 1 is presented in U.S. Pat. 3,347,767, "Method for Monitoring Oxygen Content of Gases," issued Oct. 17, 1967 to William M. Hickam. The oxygen gauge of Hickam produces an EMF which is a logarithmic function of the oxygen partial pressure of the unknown gas.

In the polarographic gauge the cathode electrode 14 is exposed to the carrier gas whose oxygen partial pressure is to be measured. Oxygen present in the carrier gas is reduced at electrode 14 to oxygen ions according to the above reaction and the oxygen ions are transported through solid electrolyte 10 to electrode 12 where they are oxidized to $O_2$.

The operation of oxygen gauge 1 in a polarographic mode is established by applying sufficient D-C voltage from variable voltage source 22 across electrode 12 and 14 to establish diffusion limited current operation. The oxygen in vicinity of electrode 14 is depleted and the cell current flow is determined by the rate at which oxygen diffuses from the body of the sample gas to the surface of electrode 14. The diffusion rate and therefore the current is a function of the amount of oxygen present in the sample gas. The diffusion limited current condition thus established renders the cell current substantially constant over a range of cell voltages and directly dependent on the rate at which oxygen diffuses to electrode 14. An optimum voltage value for establishing diffusion limited current condition for various gases at a given temperature and pressure can be determined experimentally in which case the voltage of source 24 can be preset to the desired value.

Figure 2:
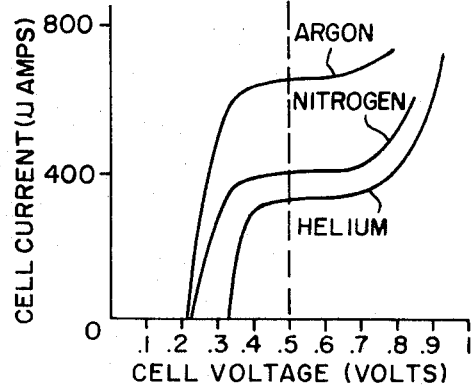
FIG. 2 is a set of curves of voltage against current of several carrier gases indicating the voltage values which establish cell operation in the polarographic mode.

In FIG. 2, the current-voltage characteristics for carrier gases of varying partial pressures of oxygen are plotted for a typical cell configuration. These characteristics will vary depending upon the electrode pore structure and the temperature of the cell. The plateau region of these curves, the portion in which the cell current is unaffected by cell voltage, represents the diffusion limited current value for the respective gases. This plateau current represents the condition wherein substantially all oxygen has been removed from the immediate vicinity of the electrode 14.

If, for example, voltage applied across electrodes 12 and 14 by voltage source 24 and as measured by voltmeter 26 is sufficient to establish cell operation under diffusion limited current conditions, the diffusion current measured by ammeter 28 will be an indication of the oxygen partial pressure of the carrier gas. When the diffusion current value measured by ammeter 28 is referred to a set of curves comparable to that illustrated in FIG. 3 the oxygen partial pressure of the carrier can be determined.

In an application where the carrier gas is known and it is necessary to determine the presence of partial pressure of oxygen in said gas the ammeter can be calibrated according to the linear relationship of diffustion current versus oxygen concentration so as to indicate oxygen partial pressure directly.

Figure 3:
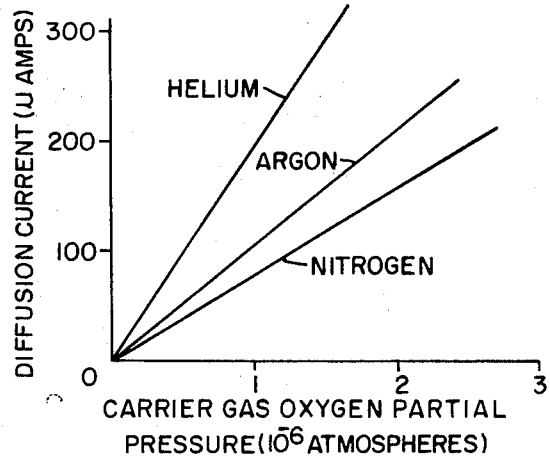
FIG. 3 is a set of curves of oxygen partial pressure against diffusion current for several carrier gases.

FIG. 3 graphically represents the diffusion current-oxygen partial pressure relationships for sample gases helium, argon, and nitrogen when oxygen gauge 1 is operated in a polarographic mode. Therefore to measure oxygen partial pressure of a specific gas, such as argon, directly on ammeter 28 all that is required is that the ammeter scale be calibrated according to the argon curve of FIG. 3 and voltage source 24 be set to apply 0.5 volt D-C across electrodes 12 and 14 according to FIG. 2 to establish gauge 1 operation under diffusion limited current conditions.

An inherent characteristic of oxygen gauge 1 operating in the polarographic mode is the increased sensitivity to low range oxygen partial pressure as compared to the EMF oxygen gauge. The presence of an electrode potential difference, which establishes diffusion limited conditions, results in the removal of oxygen from the sample gas at all levels of oxygen partial pressure. There is no addition of oxygen to the sample gas from the cell electrodes as may be experienced during operation of the EMF oxygen gauge.

Under normal operating conditions of the EMF gauge the reference gas represents the high oxygen pressure while the sample gas represents the low oxygen pressure. Therefore, in operation of the EMF gauge, the cell current produced will result in oxygen passing from the reference gas to the sample gas thereby reducing the effectiveness of the EMF gauge as a device for measuring low oxygen partial pressure. In addition to current flow due to EMF cell operation, leakage oxygen resulting from a small electronic conductivity component usually present in the electrolyte will also introduce oxygen into the low pressure gas stream.

It is apparent that the addition of oxygen to a sample gas of low oxygen concentration will greatly affect the accuracy of the gauge and render it unsuitable for measuring low oxygen partial pressures. The current flow in the polarographic gauge is such that oxygen is removed from the sample gas thus eliminating the contamination of the sample gas stream experienced during operation of the EMF gauge. The polarographic oxygen gauge which minimizes oxygen partial pressure of the sample gas provides a legitimate indication of oxygen partial pressures below $10^{-6}$ atmospheres.

Figure 4:
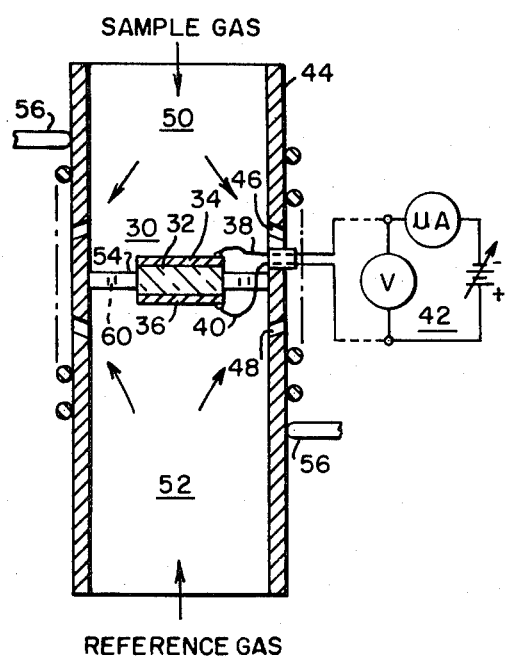
FIG. 4 is a cross-sectional view of another embodiment of the present invention.

In FIG. 4 there is illustrated a polarographic gauge comprised of a solid zirconium oxide electrolyte 32 and platinum electrodes 34 and 36. Electrical leads 38 and 40 connect electrodes 34 and 36, respectively to voltage excitation circuit 42. Sample gas enters open-ended conduit 44 under prescribed flow conditions and passes over the surface of electrode 34 before being exhausted to the atmosphere through passages 46. Reference gas is introduced through a second open end of conduit 44 and is directed to the surface of electrode 36 and subsequently exhausted through passages 48 to atmosphere. Isolated gas chambers 50 and 52 are established by the oxygen gauge assembly comprised of mounting ring 54 and oxygen sensor 30 thereby preventing the mixing of the sample and reference gases. The operation of this gauge is the same as that described with reference to FIG. 1. Electrode heating is provided by electrical heaters 56 which form a collar around conduit 44 at locations adjacent to the electrodes.

The polarographic gauges illustrated in FIG. 1 and FIG. 4 represent typical embodiments utilizing a reference gas. It is noted however that the operation of the polarographic gauge is not dependent upon the presence of a reference gas as is the EMF gauge.

The requirement of a reference atmosphere for the polarographic gauge may thus be eliminated in an alternate embodiment of FIG. 4. In FIG. 4 the addition of flow passages 60, shown by dotted lines, and the deletion of exhaust passages 46 and 48 would provide communication between gas chambers 50 and 52 and permit the flow of sample gas over electrode surfaces 34 and 36. In this method the gas to be measured is flowed past both electrodes of the gauge. Electrolysis will give a limiting current which is determined by the rate at which oxygen diffuses to the electrode surface. The diffusion rate is determined by the oxygen partial pressure, the presence of other gases and the temperature.

The use of this gauge at low oxygen pressure and without a reference gas may necessitate the use of a layer of thoria based electrolyte at the reference electrode to minimize electronic conductivity between the electrodes resulting from reduction of the electrodes in the low oxygen pressure environment.

The elimination of the requirement for a reference gas extends the areas of application of this device to in situ application as well as to manned and unmanned space applications. It is understood that although the discussion has been directed to a solid electrolyte solutions of zirconium oxide and calcium oxide that other ionic conducting solid solutions comprised of zirconium oxide in combination with one or more of the rare earth oxides such as yttrium oxide, lanthanum oxide and scandium oxide and/or the alkaline earth oxides such as strontium oxide and barium oxide could also be used.

We claim as our invention:

1. The method of operating an electrochemical cell having a solid electrolyte exhibiting significant oxygen ion conductivity and negligible electronic conductivity and a first and second electrode in a polarographic mode of operation to determine the oxygen partial pressure of a sample gas comprising the steps of, supplying said sample gas to said first electrode, providing an oxygen environment at said second electrode, applying a voltage across said first and second electrodes, adjusting the magnitude of said voltage to establish said electrochemical cell in a diffusion limited current mode of operation, wherein variations in the oxygen partial pressure of the sample gas produce changes in electrochemical cell current, and measuring said current as an indication of the oxygen partial pressure of said sample gas.

2. The method of claim 1 wherein the application of said voltage across said first and second electrodes results in the depletion of oxygen at the surface of said first electrode.

3. The method of claim 1 wherein the magnitude of said voltage is selected to be within a voltage range within which said cell current, for a given sample gas oxygen partial pressure, is substantially constant.

4. The method of claim 1 wherein the sample gas is supplied to said second electrode to provide said $O_2$ environment.

5. The method of claim 1 including, heating said electrochemical cell to a temperature in the range of about 600° C. to 1000° C.

References Cited
UNITED STATES PATENTS

| | | | |
|---|---|---|---|
| 3,347,767 | 10/1967 | Hickam | 204—195 S |
| 3,400,054 | 9/1968 | Ruka et al. | 204—1 T |

TA-HSUNG TUNG, Primary Examiner

U.S. Cl. X.R.

204—195 S